United States Patent
Balay et al.

(10) Patent No.: US 8,811,360 B2
(45) Date of Patent: Aug. 19, 2014

(54) FLEXIBLE MOBILE IP FOREIGN AGENT ARCHITECTURE FOR ENABLING CONVERGED SERVICES

(75) Inventors: Rajesh Balay, Los Altos, CA (US); Venkatesan Pradeep, Cupertino, CA (US); Chandramouli Balasubramanian, San Jose, CA (US)

(73) Assignee: Ericsson AB, Stockholm (SE)

(*) Notice: Subject to any disclaimer, the term of this patent is extended or adjusted under 35 U.S.C. 154(b) by 495 days.

(21) Appl. No.: 13/218,307

(22) Filed: Aug. 25, 2011

(65) Prior Publication Data

US 2011/0305235 A1    Dec. 15, 2011

Related U.S. Application Data

(63) Continuation of application No. 12/021,605, filed on Jan. 29, 2008, now Pat. No. 8,027,310.

(51) Int. Cl.
*H04W 4/00* (2009.01)
*H04L 12/28* (2006.01)
*H04W 8/26* (2009.01)
*H04W 80/04* (2009.01)
*H04W 8/06* (2009.01)

(52) U.S. Cl.
CPC ............... *H04W 8/26* (2013.01); *H04W 80/04* (2013.01); *H04W 8/06* (2013.01); *H04L 12/2889* (2013.01)
USPC .......................................... 370/338; 455/433

(58) Field of Classification Search
CPC .... H04L 12/2889; H04W 8/26; H04W 80/04; H04W 8/06
USPC .......... 370/338, 392, 328, 331, 349; 455/432.1, 433, 435.1
See application file for complete search history.

(56) References Cited

U.S. PATENT DOCUMENTS

| | | | |
|---|---|---|---|
| 6,490,259 B1 | 12/2002 | Agrawal et al. | |
| 6,621,810 B1 | 9/2003 | Leung | |
| 6,769,000 B1 * | 7/2004 | Akhtar et al. | 1/1 |
| 7,079,499 B1 * | 7/2006 | Akhtar et al. | 370/310 |
| 7,342,916 B2 | 3/2008 | Das et al. | |

(Continued)

OTHER PUBLICATIONS

Cisco Mobile Wireless Home Agent Feature Guide, Cisco IOS Release 12.3(14)YX, Cisco Mobile Wireless Home Agent 3.0, Dec. 22, 2005.

Narendra Venkataraman, "Mobile IP lets mobile-device users stay connected when moving to networks with different IP addresses", Sep. 1, 2005, Dr. Dobb's Journal, pp. 1-8.

(Continued)

*Primary Examiner* — Brian D Nguyen
(74) *Attorney, Agent, or Firm* — Blakely Sokoloff Taylor & Zafman LLP

(57) ABSTRACT

A method and apparatus for flexible Mobile IP foreign agent architecture for enabling converged services are described herein. According to one embodiment of the invention, a packet is received over a circuit bound with a converged services domain of a network element. The converged services domain enables forwarding of wired and wireless traffic to a plurality of destination network elements. Upon determining that the circuit is capable of carrying Mobile Internet Protocol (IP) packets, the packet is processed according to an entry in a Mobile IP forwarding information base upon determining that the packet has a corresponding entry in the Mobile IP forwarding information base, and the packet is processed according to a different entry in an IP forwarding information base upon determining that the packet does not have an entry in the Mobile IP forwarding information base. Other methods and apparatuses are also described.

10 Claims, 7 Drawing Sheets

(56) References Cited

U.S. PATENT DOCUMENTS

| | | | |
|---|---|---|---|
| 2003/0050061 A1* | 3/2003 | Wu et al. | 455/432 |
| 2003/0078962 A1* | 4/2003 | Fabbricatore et al. | 709/203 |
| 2007/0076732 A1 | 4/2007 | Kim | |
| 2007/0091862 A1 | 4/2007 | Ioannidis | |
| 2007/0189218 A1* | 8/2007 | Oba et al. | 370/331 |
| 2008/0043659 A1* | 2/2008 | Richards et al. | 370/313 |
| 2008/0101348 A1* | 5/2008 | Verkama et al. | 370/356 |
| 2008/0151815 A1* | 6/2008 | Bedekar et al. | 370/328 |
| 2008/0159139 A1* | 7/2008 | Smith et al. | 370/231 |
| 2008/0186930 A1 | 8/2008 | Choi et al. | |
| 2009/0168768 A1 | 7/2009 | Chiabaut et al. | |
| 2009/0274154 A1 | 11/2009 | Kopelman et al. | |

OTHER PUBLICATIONS

C. Perkins, Nokia Research Center, P. Calhoun, Cisco Systems, Inc., J. Bharatia, Nortel Networks, Mobile IPv4 Challenge/Response Extensions (Revised) (RFC 4721) Jan. 2007.

C. Perkins, Nokia Research Center, "IP Mobility Support for IPv4", RFC 3344, Aug. 2002.

G. Montenegro, Editor, Sun Microsystems, Inc., "Reverse Tunneling for Mobile IP, revised", RFC 3024, Jan. 2001.

Restriction Requirement mailed Apr. 6, 2011, U.S. Appl. No. 12/021,605, 6 pgs.

Notice of Allowance mailed May 25, 2011, U.S. Appl. No. 12/021,605, 11 pgs.

* cited by examiner

FLEXIBLE MOBILE IP FOREIGN AGENT ARCHITECTURE FOR ENABLING CONVERGED SERVICES

CROSS-REFERENCE TO RELATED APPLICATIONS

This application is a continuation of application Ser. No. 12/021,605 filed Jan. 29, 2008, (now U.S. Pat. No. 8,027,310 issued Sep. 27, 2011) which is hereby incorporated by reference.

BACKGROUND

1. Field

Embodiments of the invention relate to the field of networking; and more specifically, to the architecture of a Mobile Internet Protocol (IP) foreign agent architecture.

2. Background

Mobile IP is a protocol which allows laptop computers or other mobile computer units (referred to as mobile nodes herein) to roam between various sub-networks at various locations, while maintaining Internet and/or WAN connectivity. Mobility agents (e.g., home agent, foreign agent) provide mobile IP functionality. In a Mobile IP network, each mobile node is identified by its home address (assigned by a home agent), regardless of its current point of attachment to the Internet. While situated away from its home, a mobile node is also associated with a care-of address (provided by a foreign agent), which indicates its current point of attachment for reachability. While a mobile node is away from its home and connected to a foreign network it requests registration through the foreign agent to the home agent. If registration is successful, when the mobile node's home network receives packets addressed to the mobile node, the home agent will send those packets, over a tunnel, to the foreign agent which in turns forwards the packets to the mobile node. When the mobile node is sending packets, the foreign agent may employ reverse-tunneling and send the packets to the home agent who in turn forwards the packets to their destination, or the foreign agent may directly forward the packets to their destinations.

In a typical Mobile IP network, a service provider (e.g., a mobile service provider which provides services such as wireless network access) may belong to one or more home agents. Some of these home agents may be allocating IP addresses from a private address space while providing Internet connectivity through Network Address Translation (NAT) and there is a possibility that IP addresses assigned to the mobile nodes overlap. To support the overlapping address space, the prior art typically provisions a separate forwarding table for each overlapping address space. In addition, the home agents are typically paired with a foreign agent (e.g., FA-HA). The home agents may be paired with multiple foreign agents and the foreign agents may be paired with multiple home agents. For each pairing, there exists a tunnel between the foreign agent and the home agent, and a separate forwarding table for the pairing. As a single foreign agent may be paired with multiple home agents belonging to the same service provider, multiple forwarding tables may exist for the same service provider, which will store in part duplicative information. Additionally, another disadvantage of this prior art technique is that additional services relative to the service provider are difficult and/or inefficient to provide. For example, policies for the service provider (e.g., firewall, quality of service (QoS), packet filters, etc.) must be separately applied for each forwarding structure.

Additionally, the service provider also may be providing other services (e.g., broadband network access, virtual private network (VPN) services, etc.). In a typical network element, the routing structures for these other services are separate from the routing structures related to the Mobile IP network. Thus, a different routing domain exists for each type of service provided. Additionally, a typical service provider that provides mobile services as well as broadband network access service, VPN service, etc, requires multiple physical nodes to provide functionality for routing. Thus, a disadvantage of a typical network is that multiple routing structures each representing a type of service may exist for the service provider. Additionally, in a typical network element, polices applied to the network traffic related to the service provider (e.g., firewall, quality of service (QoS), packet filters, etc.) are applied to separately to each routing domain. Thus, in the case of a separate routing domain for each type of service, the same policies may be applied multiple times (e.g., the same policy is applied for Mobile IP traffic and broadband traffic).

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
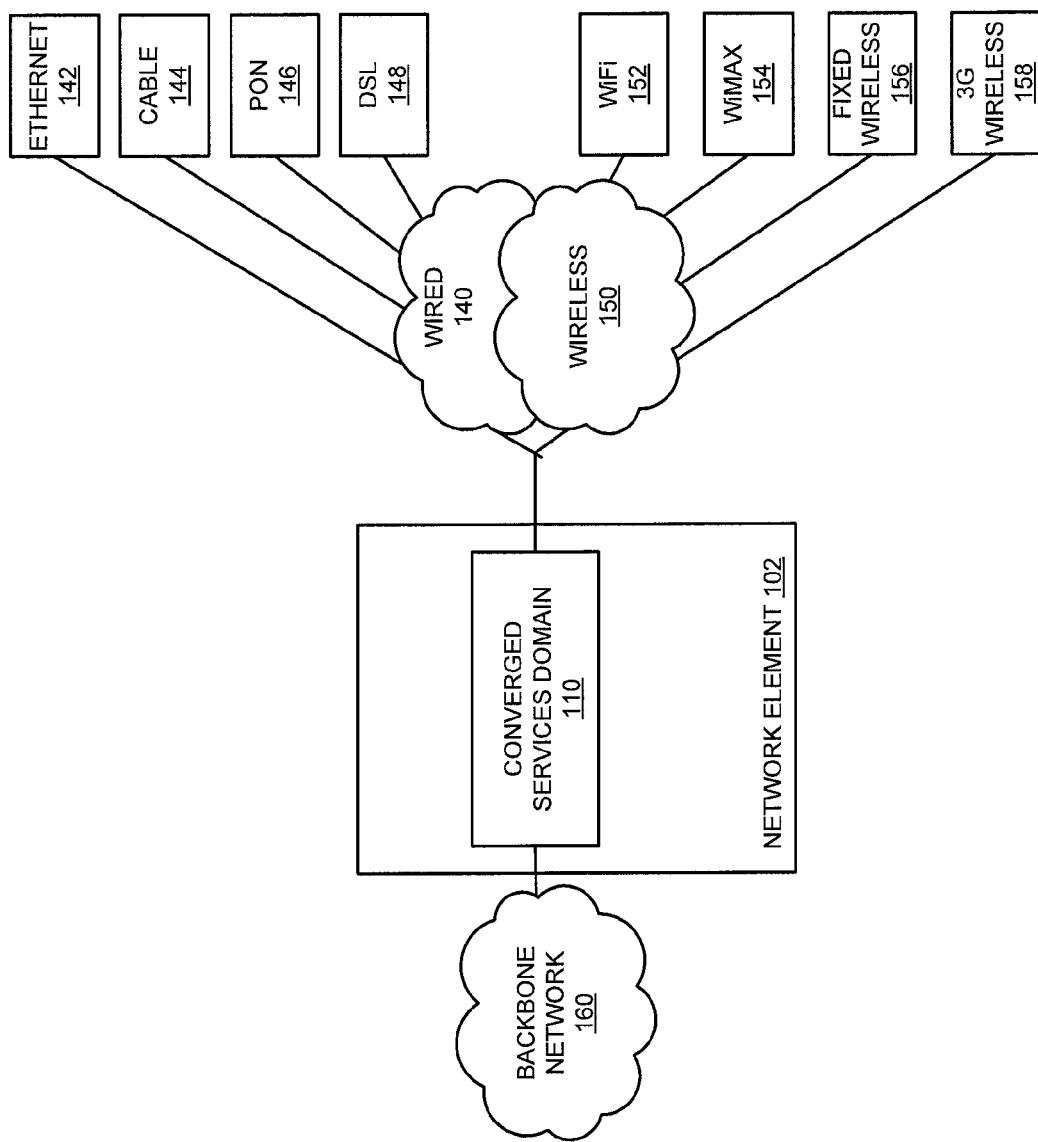
FIG. 1 illustrates an exemplary network element with a converged services domain according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more computers. Such computers store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computers typically include a set of one or more processors coupled to one or more other components, such as a storage device, a number of user input/output devices (e.g., a keyboard and a display), and a network connection. The coupling of the set of processors and other components is typically through one or more busses and bridges (also termed as bus controllers). The storage device and network traffic respectively represent one or more machine storage media and machine communication media. Thus, the storage device of a given computer system typically stores code and data for execution on the set of one or more processors of that computer. Of course, one or more parts of an embodiment of the invention may be implemented using different combinations of software, firmware, and/or hardware.

A method and apparatus for flexible Mobile IP foreign agent architecture for enabling converged services is described. In one embodiment of the invention, a single converged services domain is associated with a service provider to provide routing functionality for the service provider regardless of the service being wired or wireless. In another embodiment of the invention, a separate routing context exists for overlapping addresses of the service provider.

FIG. 1 illustrates an exemplary network element with a converged services domain according to one embodiment of the invention. Included within FIG. 1 is network element 102. A network element is an electronic device that provides support or services of a computer network. For example, a network element may be an intermediate device in the network (e.g., router, bridge, switch, etc.). Included within network element 102 is converged services domain 110. A context is a logical grouping of the resources and data provided by network element 102. For example, converged services domain 110 may be thought of as a virtual router, virtual bridge, etc. In addition, typically the resources and data represented by converged services domain 110 is independent to whomever belongs to the converged services domain 110. For example, if service provider A belongs to converged services domain 110, service provider B does not have access to the resources and data in converged services domain 110. The resources and data provided by converged services domain 110 may include packet forwarding, security, accounting, and subscriber management. A service provider can associate a subscriber (e.g., an end user) with its context by binding the subscriber with the context.

Coupled with converged services domain 110 are wired and wireless services. For example, Ethernet 142, Cable 144, Passive Optical Network (PON) 146, Digital Subscriber Line (DSL) 148 is each coupled with converged services domain 110 through wired network cloud 140. According to one embodiment of the invention, the wired services may belong to a single service provider (e.g., service provider A). In addition, WiFi 152, WiMAX 154, fixed wireless 156, and 3G wireless 158 are each coupled with wireless network cloud 150. The wireless services also may belong to a single service provider (e.g., service provider B). Additionally, the wired services and the wireless services may belong to a single service provider (e.g., service provider C). Thus, a single service provider may provide services that include wired and wireless services. If a single service provider provides wired and wireless services, each of the wired and wireless services belongs to converged services domain 110. Thus, a single converged services domain is providing resources and data (e.g., packet forwarding) to a single service provider for wired and wireless services. Also coupled with network element 102 is backbone network 160.

Figure 2:
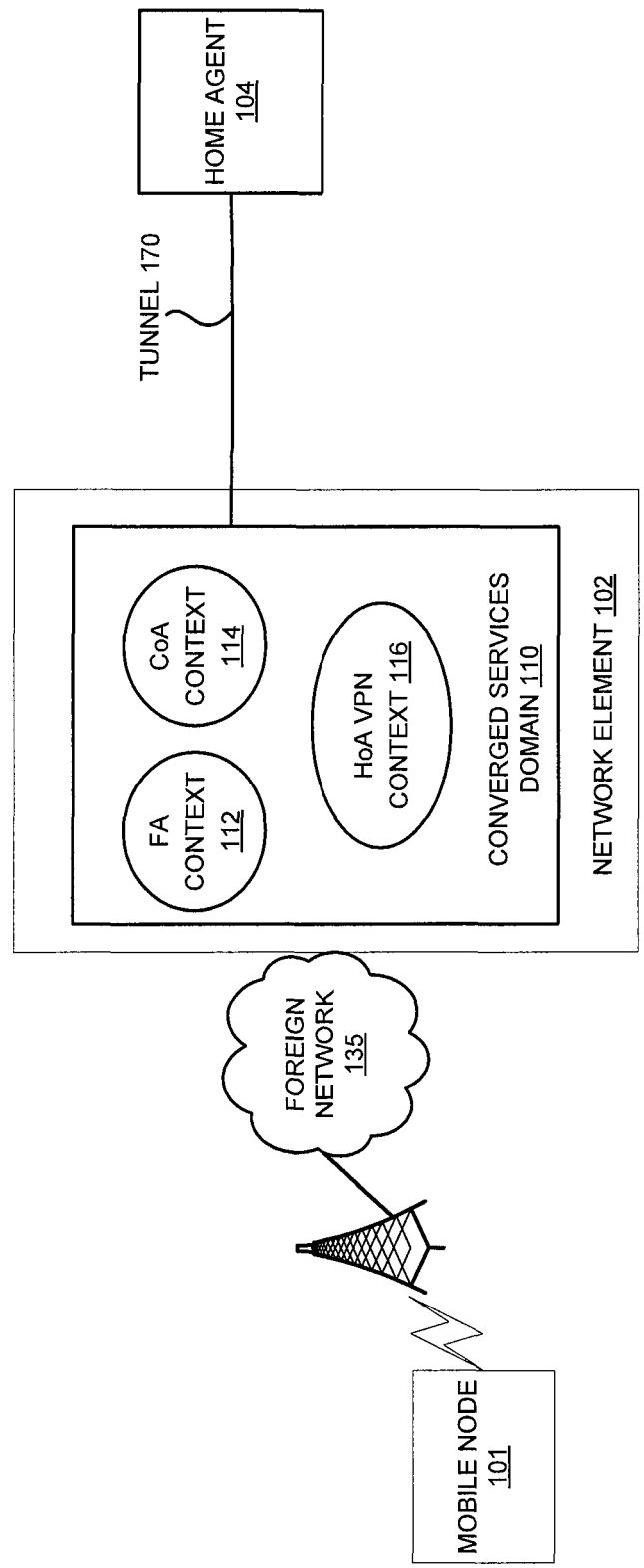
FIG. 2 illustrates an exemplary network element with a converged services domain coupled with a home agent and a mobile node according to one embodiment of the invention.

FIG. 2 illustrates an exemplary network element with converged services domain 110 coupled with a home agent 104 and a mobile node 101 according to one embodiment of the invention. The mobile node 101 belongs to the home agent 104. In other words, the home agent 104 provides IP connectivity (e.g., a permanent IP address, called a home address) to the mobile node 101. Included within converged services domain 110 are foreign agent (FA) context 112, care-of-address (CoA) context 114, and home address (HoA) virtual private network (VPN) context 116.

According to one embodiment of the invention, the FA context 112 hosts the main Mobile IP functionality including the interface binding to the mobile access network (e.g., foreign network 135). For example, the FA context 112 may bind one or more circuits which each may carry Mobile IP traffic. While in one embodiment of the invention traffic received on a circuit bound to the FA context 112 is Mobile IP traffic, in alternative embodiments of the invention traffic received on a circuit bound to the FA context 112 is non-Mobile IP traffic. In order to provide Mobile IP routing functionality, a Mobile IP forwarding information base (MIP FIB) is provisioned within FA context 112. A Mobile IP forwarding information base may include the context that includes the tunnel 170 binding the converged services domain 110 with the home agent 104 (i.e., the circuit for reverse tunneling) to be used as a nexthop and an identifier of the mobile node 101 (e.g., IP address, MAC address, network access identifier, etc.) according to one embodiment of the invention. In addition to providing support for Mobile IP traffic, FA context 112 also includes routing functionality for non-Mobile IP traffic according to one embodiment of the invention. For example, FA context 112 may include an Internet Protocol (IP) forwarding information base to provide routing functionality for IP traffic. In addition, FA context 112 may also indicate one or more home agents which belong to the converged services domain 110.

The converged services domain 110 has a set of one or more Care-of Addresses (CoA) that are used as tunnel endpoints for the home agent tunnels. For example, one CoA is associated with the tunnel 170. It should be understood that in certain embodiments of the invention the tunnel 170 carries Mobile IP traffic as well as non-Mobile IP traffic (e.g., BRAS subscriber traffic, enterprise VPN traffic, etc.). The CoA is a temporary address that allows a home agent to forward messages to the network element 102 via the converged services domain 110. It should be understood that a CoA is not shared between converged services domains. That is, a CoA is unique to a converged services domain. The CoA Context 114 includes the CoAs that are provisioned for the converged services domain 110 according to one embodiment of the invention. Thus, the CoA context 114 provides reachability to the home agents (e.g., the home agent 104). According to one embodiment of the invention, the CoA context 114 may be the same as the FA context 112 and/or the HoA VPN context 116 (e.g., the CoA context 114 shares the same resources as the FA context 112 and/or HoA VPN context 116).

According to one embodiment of the invention, the HoA VPN context 116 provides separation between the IP-address space used by a set of one or more home agents belonging to a single service provider. In other words, it is possible for a service provider who belongs to a set of one or more home agents to allocate overlapping home addresses (HoAs). The HoA VPN context 116 provides separation for the overlapping address space by hosting forwarding information of all the registered mobile nodes belonging to that HoA VPN context. According to one embodiment of the invention there is a separate HoA VPN context for each overlapping HoA address space. The 140A VPN context 116 also includes the tunnel interface binding for the converged services domain 110 and the home agent 104. According to one embodiment of the invention, the HoA VPN context 116 may be the same as the FA context 112 and/or the CoA context 114 (e.g., the HoA VPN context 116 shares the same resources as the FA context 112 and/or the CoA context 114).

The converged services domain 110 advertises that it is acting as a foreign agent. Included in the advertisements are the CoAs provisioned for the converged services domain 110. The mobile node 101 uses one of the CoAs in a Mobile IP registration request. Also included in the Mobile IP registration request is the IP address of the home agent for which the mobile node 101 belongs and the home address of the mobile node 101. Upon receiving the Mobile IP registration request and determining that the request is valid (e.g., the IP address of the home agent 104 belongs to the converged services domain 110) the converged services domain 110 relays the registration request to the home agent 104. Upon the home agent 104 successfully registering the mobile node 101, the home agent 104 sends a Mobile IP registration reply to the CoA context that includes the CoA that was used in the Mobile IP registration request. The network element 102 adds a forwarding route for the mobile node 101 after receiving the Mobile IP registration reply. For example, in one embodiment of the invention a route is added to an IP forwarding information base that includes information on how to reach the mobile node (i.e., for packets destined for the mobile node). According to one embodiment of the invention, the Mobile IP forwarding base is updated for the mobile node 101 (e.g., for reverse tunneling purposes).

Although not illustrated in FIG. 2, it should be understood that in certain embodiments of the invention the converged services domain 102 provides services in addition to Mobile IP functionality (e.g., enterprise VPN services, Metro-Ethernet service, BRAS services, etc.). Thus, if a service provider is providing Mobile IP services and other services the converged services domain 102 allows the service provider to have a single routing domain and share the same resources (e.g., forwarding tables, interfaces, policies, etc.) regardless of the type of service. Additionally, a single tunnel may be used to carry Mobile IP traffic and BRAS subscriber traffic. For example, the tunnel 170 may be used to carry Mobile IP traffic and BRAS subscriber traffic.

Figure 3:
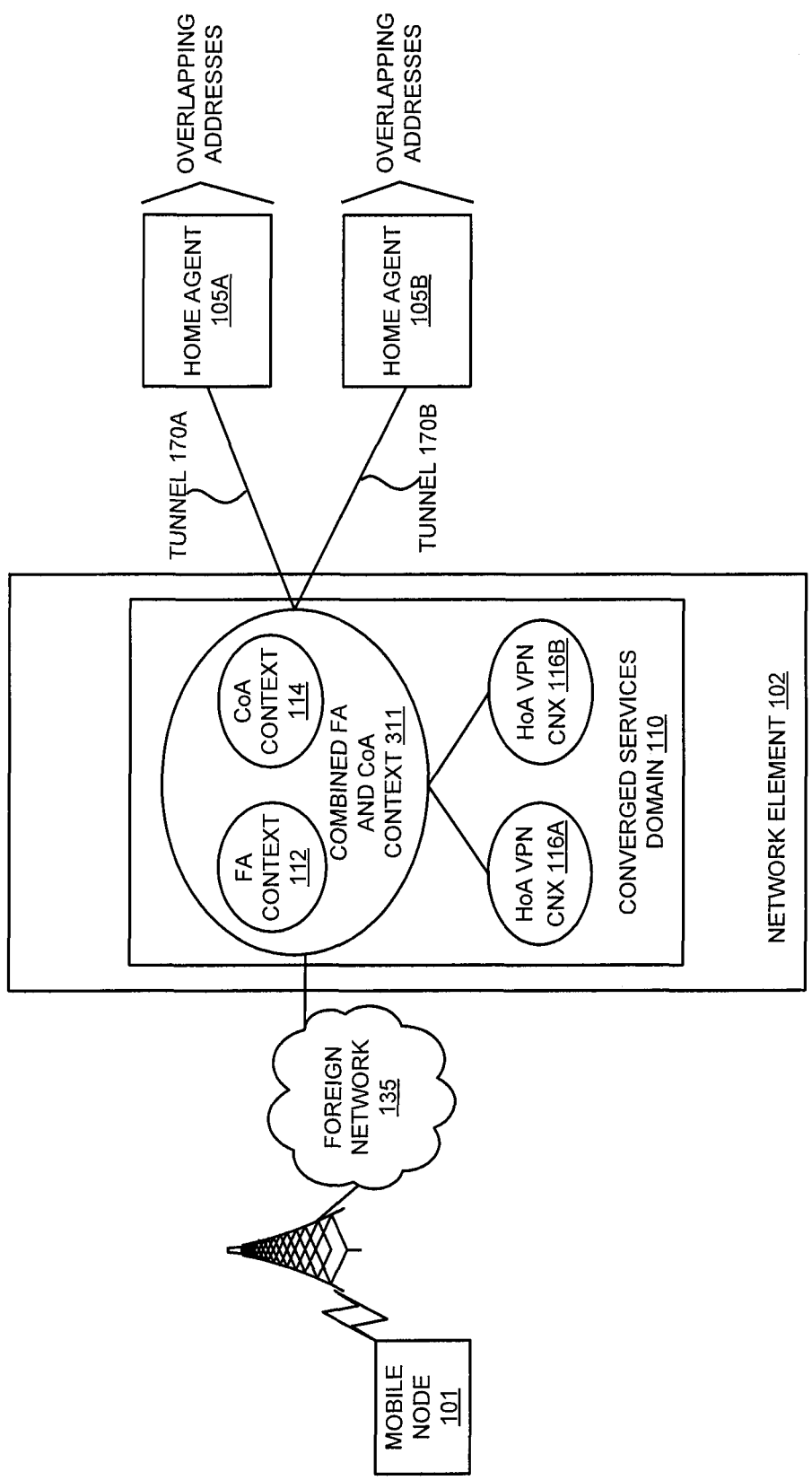
FIG. 3 illustrates an exemplary network element with a converged services domain coupled with a first and second home agent that each have overlapping network addresses, and further coupled with a mobile node according to one embodiment of the invention.

FIG. 3 illustrates an exemplary network element 102 with the converged services domain 110 coupled with home agent 105A and home agent 105B that each have overlapping network addresses, and further coupled with a mobile node 101 according to one embodiment of the invention. Thus, each home agent allocates overlapping HoAs to the mobile nodes. Home agent 105A and home agent 105B are independent from each other. For example, home agent 105A belongs to customer A and home agent 105B belongs to customer B. The mobile node 101 belongs to the home agent 105A or the home agent 105B. Included within the converged services domain 110 is a combined FA and CoA context 311, a HoA VPN context 116A, and a HoA VPN context 116B. The combined FA and CoA context 311 includes the FA context 112 and the CoA context 114. Thus, the routing functionality (both Mobile IP routing functionality and non-Mobile IP routing functionality) is shared between the customer that belongs to home agent 105A and the customer that belongs to home agent 105B. These shared routing tables conserve resources in the network element 102. For example, independent routing tables may include substantially similar overlapping routes. Sharing the routing tables not only conserves disk space it also allows easier management of the routing tables (e.g., if a common route is updated only one routing table requires the update).

The HoA VPN context 116A and the HoA VPN context 116B provide separation for the overlapping HoAs belonging to the home agent 105A and the home agent 105B respectively. For example, the home agent 105A and the home agent 105B allocate HoAs from a private address space while providing Internet connectivity using network address translation (NAT). As some HoAs overlap, according to one embodiment of the invention a separate Mobile IP routing table and a separate non-Mobile IP routing table is maintained for each HoA VPN context. For example, the HoA VPN context 116A includes a separate Mobile IP routing table and a separate non-Mobile IP routing table for the overlapping HoA space of home agent 105A. Additionally, the tunnel from the converged services domain 110 to home agent 105A and the tunnel from the converged services domain 110 to home agent 105B are bound to interfaces in HoA VPN context 116A and HoA VPN context 116B respectively.

Although not illustrated in FIG. 3, it should be understood that in certain embodiments of the invention the converged services domain 102 provides services in addition to Mobile IP functionality (e.g., enterprise VPN services, Metro-Ethernet service, BRAS services, etc.). Thus, if a customer is providing Mobile IP services and other services the converged services domain 102 allows the customer to have a single routing domain and share the same resources (e.g., forwarding tables, interfaces, policies, etc.) regardless of the type of service. Additionally, a single tunnel may be used to carry Mobile IP traffic and BRAS subscriber traffic.

Figure 4:
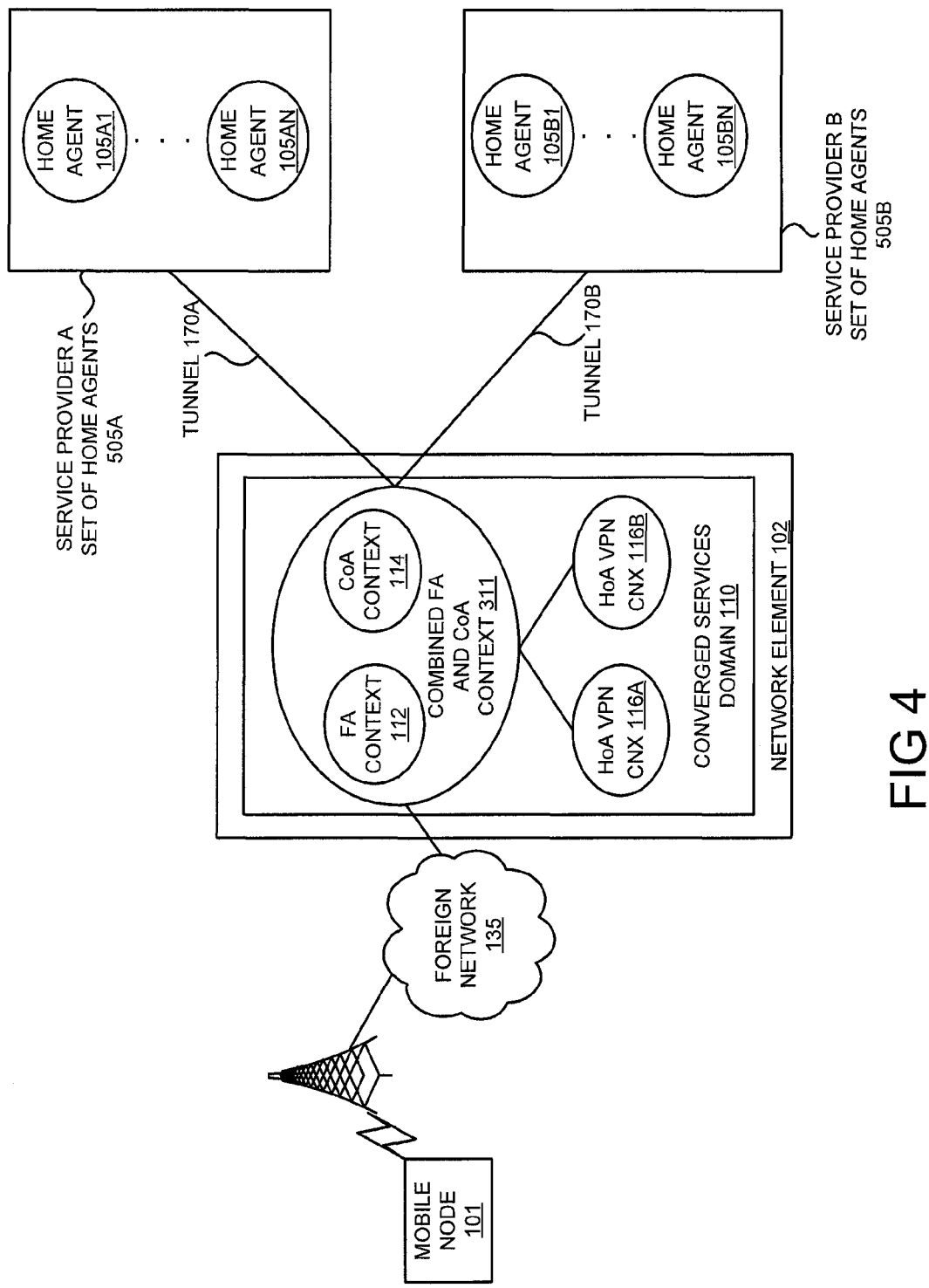
FIG. 4 illustrates an exemplary network element with a converged services domain coupled with a set of one or more home agents belonging to a first service provider and a set of one or more home agents belonging to a second service provider, and further coupled with a mobile node according to one embodiment of the invention.

FIG. 4 illustrates an exemplary network element 102 with the converged services domain 110 coupled with a set of one or more home agents belonging to the service provider A and a set of one or more home agents belonging to a second service provider B, and further coupled with a mobile node 101 according to one embodiment of the invention. The service provider A belongs to a set of home agents 505A (e.g., home agent 105A1 to home agent 105AN) where the service provider A does not allocate overlapping HoAs. The service provider B belongs to a set of home agents 505B (e.g, home agent 105B1 to home agent 105BN) where the service provider B does not allocate overlapping HoAs. However, it should be understood that a HoA allocated by service provider A may be the same as a HoA allocated by service provider B. Thus, the home agents 505A and the home agents 505B are grouped accordingly.

The set of home agents 505A and the set of home agents 505B are each coupled with the combined FA and CoA context 311. Thus, the routing functionality (both Mobile IP routing functionality and non-Mobile IP routing functionality) is shared between the service provider A that belongs to the set of home agents 505A and the service provider B that belongs to home agent 105B. These shared routing tables conserve resources in the network element 102. For example, independent routing tables may include substantially similar overlapping routes. Sharing the routing tables not only conserves disk space it also allows easier management of the routing tables (e.g., if a common route is updated only one routing table requires the update).

The HoA VPN context 116A and the HoA VPN context 116B provide separation for the overlapping HoAs belonging to the set of home agents 505A and the set of home agents 505B respectively. For example, the set of home agents 505A and the set of home agents 505B allocate HoAs from a private address space while providing Internet connectivity using network address translation (NAT). As some HoAs overlap, according to one embodiment of the invention a separate Mobile IP routing table and a separate non-Mobile IP routing table is maintained for each HoA VPN context. For example, the HoA VPN context 116A includes a separate Mobile IP routing table and a separate non-Mobile IP routing table for the overlapping HoA space of the set of home agents 505A. Additionally, the tunnel from the converged services domain 110 to home agent 105A and the tunnel from the converged services domain 110 to home agent 105B are bound to interfaces in HoA VPN context 116A and HoA VPN context 116B respectively.

Although not illustrated in FIG. 4, it should be understood that in certain embodiments of the invention the converged services domain 102 provides services in addition to Mobile IP functionality (e.g., enterprise VPN services, Metro-Ethernet service, BRAS services, etc.). Thus, if service provider A is providing other services in addition to Mobile IP service, the converged services domain 102 allows the service provider A to have a single routing domain and share the same resources (e.g., forwarding tables, interfaces, policies, etc.) regardless of the type of service.

Figure 5:
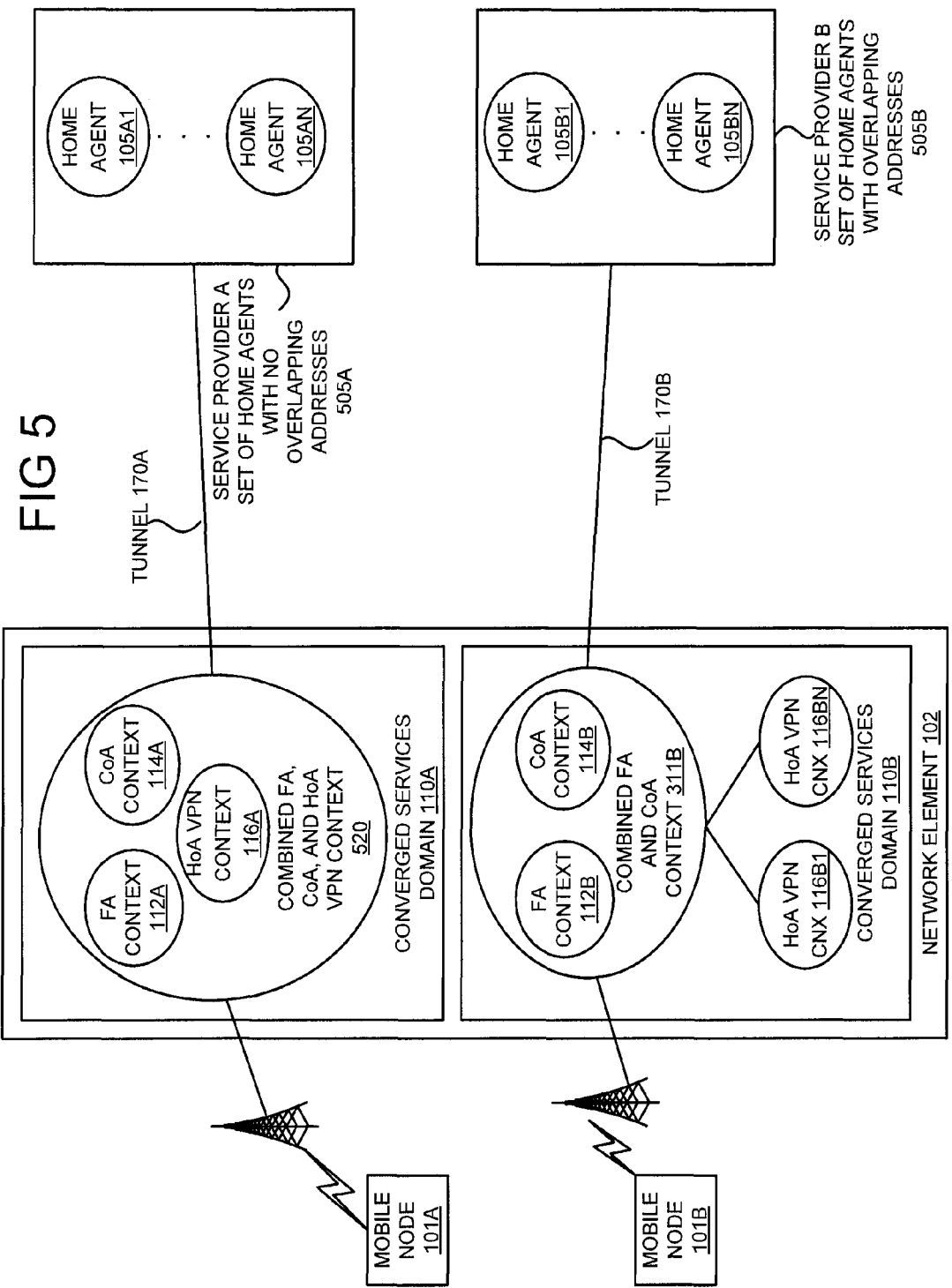
FIG. 5 illustrates an exemplary network element with a first and a second converged services domain coupled with a set of one or more home agents that does not include overlapping network addresses belonging to a first service provider, and further coupled with a set of one or more home agents that includes overlapping network addresses belonging to a second service provider according to one embodiment of the invention.

FIG. 5 illustrates an exemplary network element 110 with a converged services domain 110A and a converged services domain 110B coupled with a set of one or more home agents that does not include overlapping network addresses belonging to a service provider A, and a set of one or more home agents that includes overlapping network addresses belonging to a service provider B according to one embodiment of the invention. Furthermore, the mobile node 101A is coupled with the converged services domain 110A and belongs to one of home agents in the set of home agents 505A, and the mobile node 101B is coupled with the converged services domain 110B and belongs to one of the home agents in the set of home agents 505B. Note that, unlike the example in FIG. 4, the home agents belonging to service provider A and the home agents belonging to service provider B each are associated with a different converged services domain. Thus, there is a converged service domain for each service provider according to one embodiment of the invention.

Included within the converged services domain 110A is combined FA, CoA, and HoA VPN context 520. Included within the combined FA, CoA, and HoA VPN context 520 is FA context 112A, CoA context 114A, and HoA VPN context 116A. Thus, there is a single context providing Mobile IP service to multiple home agents belonging to a single service provider. In other words, the combined FA, CoA, and HoA VPN context 520 is shared by multiple foreign agent/home agent associations. This allows the network element 102 to participate as a single node in the service provider's routing domain. Thus, Mobile IP routing functionality, non-Mobile IP routing functionality, and interfaces may be shared. Furthermore policies (e.g., packet filter, QoS, firewall, etc.) related to the service provider A may be applied to the packets regardless of which home agent the mobile node belongs.

Although not illustrated in FIG. 5, it should be understood that in certain embodiments of the invention the converged services domain 102A provides services in addition to Mobile IP functionality (e.g., enterprise VPN services, Metro-Ethernet service, BRAS services, etc.). Thus, if service provider A is providing other services in addition to Mobile IP service, the converged services domain 102A allows the service provider A to have a single routing domain and share the same resources (e.g., forwarding tables, interfaces, policies, etc.) regardless of the type of service. Additionally, a single tunnel may be used to carry Mobile IP traffic and BRAS subscriber traffic. For example, in addition to carrying Mobile IP traffic, the tunnel 170A also may carry BRAS subscriber traffic.

Included within the converged services domain 110B is combined FA and CoA context 311B, and HoA VPN context 116B1 and HoA VPN context 116BN. The service provider B belongs to a set of home agents 505B where one home agent (i.e., home agent 105B1) has allocated overlapping HoAs. The HoA VPN context 105BN represents all of the home agents in the set of home agents 505B that do not allocate overlapping HoAs. The HoA VPN context 116B1 provides separation for the overlapping HoAs of the home agent 105B1. For example, the home agent 105B1 allocates HoAs from a private address space while providing Internet connectivity using network address translation (NAT). As some HoAs overlap, according to one embodiment of the invention a separate Mobile IP routing table and a separate non-Mobile IP routing table is maintained for the HoA VPN context 116B1 and the HoA VPN context 116BN. For example, the HoA VPN context 116B1 includes a separate Mobile IP routing table and a separate non-Mobile IP routing table for the overlapping HoA space of the home agent 105B, and the HoA VPN context 116BN includes a separate Mobile IP routing table and a separate non-Mobile IP for all of the home agents in the set of home agents 505B that do not allocate overlapping HoAs. Additionally, the tunnels from the converged services domain 110B to each of the home agents 105B1-105BN are bound to interfaces in HoA VPN context 116B1 and the HoA VPN context 116BN respectively.

Although not illustrated in FIG. 5, it should be understood that in certain embodiments of the invention the converged services domain 102B provides services in addition to Mobile IP functionality (e.g., enterprise VPN services, Metro-Ethernet service, BRAS services, etc.). Thus, if service provider B is providing other services in addition to Mobile IP service, the converged services domain 102B allows the service provider B to have a single routing domain and share the same resources (e.g., forwarding tables, interfaces, policies, etc.) regardless of the type of service. Additionally, a single tunnel may be used to carry Mobile IP traffic and BRAS subscriber traffic. For example, in addition to carrying Mobile IP traffic, the tunnel 170B also may carry BRAS subscriber traffic.

In one embodiment of the invention, an entity (e.g., wholesale service provider) belonging to the network element 102 is providing wholesale service to the service provider A and to the service provider B. In this situation, the HoA VPN context 116A and the HoA VPN context 116BN may be provisioned as a single HoA VPN. As the home agent 105B1 has an overlapping address space, the HoA VPN context 116B1 remains a separate context. In other words, the information and resources allocated to the HoA VPN context 116A and the HoA VPN context 116BN are shared across the converged services domain 110A and the converged services domain 110B. Thus, the HoA VPN context 116A and the HoA VPN context 116BN may be combined and shared by multiple foreign agent/home agent associations. This allows the network element 102 to participate as a single node in the wholesale service provider's routing domain. Furthermore, policies (e.g., packet filter, QoS, firewall, etc.) related to the wholesale service provider may be applied according to the HoA VPN contexts (e.g., the combined HoA VPN context 116A and 116BN, and the HoA VPN context 116B1). Furthermore, additional policies related to the individual service provider (e.g., service provider A and service provider B) may be applied according to the FA context for which the service provider belongs (e.g., FA context 112A and FA context 112B respectively). Thus, policies may be shared for all service providers (e.g., relative to the wholesale service provider) and independently for each service provider simultaneously.

Figure 6:
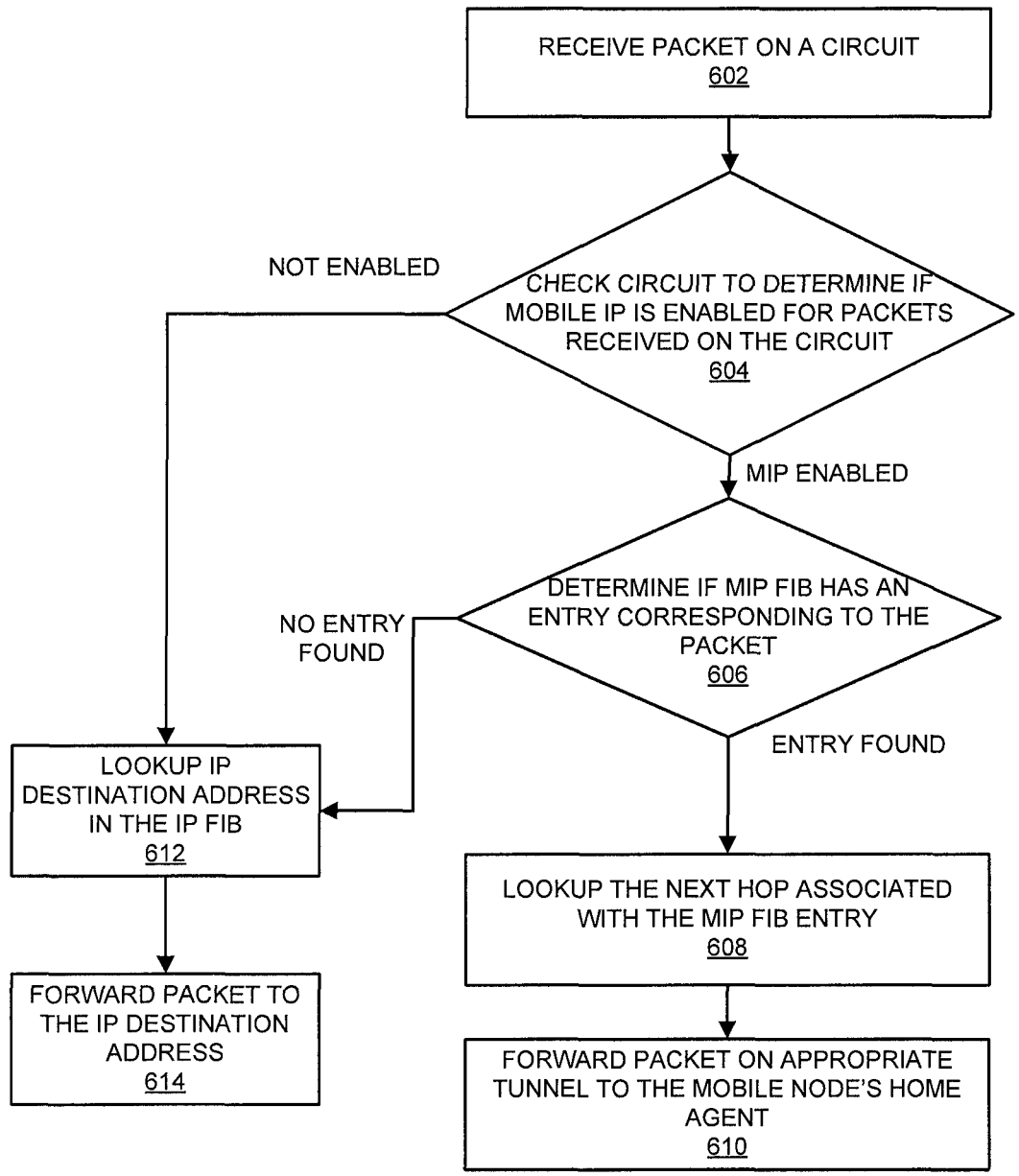
FIG. 6 is a flow diagram illustrating an exemplary packet processing flow for packets received at a network element according to one embodiment of the invention.

FIG. 6 is a flow diagram illustrating an exemplary packet processing flow for packets received at a network element according to one embodiment of the invention. The operations of the flow diagram FIG. 6 will be described with reference to the exemplary embodiment of FIG. 2. However, it should be understood that the operations of the flow diagram FIG. 6 can be performed by embodiments of the invention other than those discussed with reference to FIG. 2, such as FIGS. 3, 4 and 5, and the embodiments discussed with reference to FIG. 2 can perform operations different than those discussed with reference to the flow diagram FIG. 6.

At block 602 a packet is received on a circuit at the network element. For example, with reference to FIG. 2, a packet is received at the network element 102. At block 604 the network element 102 checks the circuit to determine if Mobile IP processing is enabled for packets received on the circuit. For example, referring to FIG. 2, the network element 102 determines if the circuit is associated with the FA context 112. If the circuit is associated with FA context 112, the packets received on the circuit may be Mobile IP packets (e.g., the packets may originate from the mobile node 101). Thus, at block 606 a determination is made whether the Mobile IP forwarding information base (MIP FIB) has an entry corresponding to the packet received. While according to one embodiment of the invention the source MAC address included in the packet is used in this determination, in alternative embodiments of the invention different identifying characteristics of the packet may be used in this determination (e.g., the source MAC address included in the packet, the source IP address of the packet, other identifying attributes included in the packet, etc.). If there is an entry in the MIP FIB, then the packet is a Mobile IP packet. At block 608 the next hop associated with the MIP FIB is determined and the packet is forwarded on the appropriate tunnel to the mobile node's home agent. For example, referring to FIG. 2, packets are forwarded from the network element to the home agent 104 across the tunnel 170.

Referring back to block 604, if Mobile IP processing is not enabled for packets received on the circuit, then the packet is processed as a non-Mobile IP packet and flow moves to block 612. Similarly, referring back to block 606, if Mobile IP processing was enabled for packets received on the circuit but the packet does not have a corresponding entry in the MIP FIB, then it is assumed the packet is not a Mobile-IP packet and flow moves to block 612. At block 612 the packet's destination is looked up with use of an IP forwarding information base and at block 614 the packet is forwarded to its destination.

Figure 7:
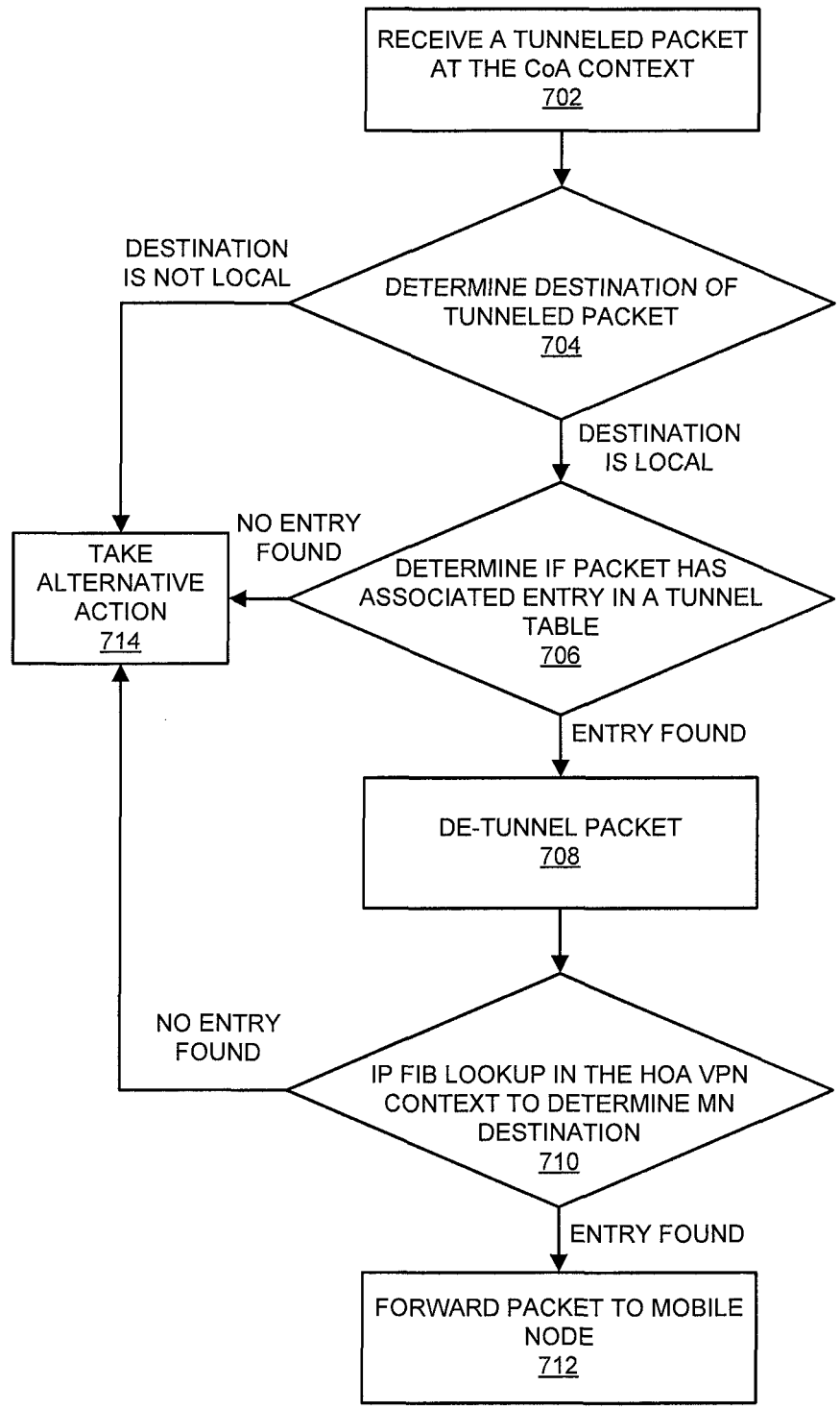
FIG. 7 is a flow diagram illustrating an exemplary packet processing flow for tunneled packets received at a network element according to one embodiment of the invention.

FIG. 7 is a flow diagram illustrating an exemplary packet processing flow for tunneled packets received at a network element according to one embodiment of the invention. The operations of the flow diagram FIG. 7 will be described with reference to the exemplary embodiment of FIG. 2. However, it should be understood that the operations of the flow diagram FIG. 7 can be performed by embodiments of the invention other than those discussed with reference to FIG. 2, such as FIGS. 3, 4 and 5, and the embodiments discussed with reference to FIG. 2 can perform operations different than those discussed with reference to the flow diagram FIG. 7.

At block 702, a tunneled packet is received by a network element at a CoA context and control moves to block 704. For example, referring to FIG. 2, a packet sent on the tunnel 170 is received by the network element 102 at the CoA context 114. The tunneled packet may be various tunneling protocols (e.g., IP in IP, Generic Routing Encapsulation (GRE), L2TP, etc.). A tunnel that is terminated at the CoA context (e.g., a tunnel that has an endpoint in the CoA context) may carry Mobile IP traffic as well as non-Mobile IP traffic (e.g., BRAS subscriber traffic, enterprise VPN traffic, etc.) according to certain embodiments of the invention. Thus, referring to FIG. 2, the converged services domain 110, through the CoA context 114, is capable of terminating Mobile IP traffic received from the home agent 104 as well as other types of traffic (e.g., BRAS subscriber traffic, enterprise VPN traffic, Metro-Ethernet traffic, etc.) which may or may not be associated with the service provider belonging to the home agent 104. This allows the service provider to have a common routing domain and share the same resources regardless of the type of service it is provided.

At block 704, the destination of the tunneled packet is determined. According to one embodiment of the invention an IP forwarding information base lookup is performed in the CoA context to determine the destination of the tunneled packet. If the destination of the tunneled packet is local (i.e., the destination address is associated with the network element) then flow moves to block 706. If the destination of the tunneled packet is not local then the packet is not destined for a mobile node associated with the converged services domain and control moves to block 714 where alternative action is taken (e.g., the packet is processed further and sent further towards its destination, the packet is dropped, etc.).

At block 706, a determination is made whether the packet has an associated entry in a tunnel table. According to one embodiment of the invention, the tunnel table lookup is based on the source IP fields and the destination fields of the tunneled packet. If a tunnel entry is not found then control flow moves to block 714 where alternative action is taken (e.g., the packet is dropped, etc.). If a tunnel entry is found then the packet is de-tunneled at block 708. The packet is then further processed based on which HoA VPN context the circuit is bound to. At block 710, an IP forwarding information base lookup is performed in the HoA VPN context to determine the destination of the mobile node. If an entry in the IP FIB exists for the mobile node the packet is forwarded to the mobile node at block 712. Thus, referring to FIG. 2, an IP FIB lookup is performed in the HoA VPN context 116 which will result in the destination of the mobile node 101. If an entry does not exist for the mobile node then control flow moves to block 714 where alternative action is taken (e.g., the packet is dropped, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method of processing a tunneled packet received at a network element, comprising:
    receiving the tunneled packet at a converged services domain, wherein the converged services domain is capable of processing wired and wireless service, wherein the converged services domain includes a foreign agent context, a care-of address (CoA) context, and a home address (HoA) virtual private network (VPN) context, wherein the foreign agent context includes a binding of a circuit to a mobile node, wherein the CoA context includes a set of one or more care of addresses that are used as tunnel endpoints, wherein the received tunneled packet is received at one of the set of care-of addresses, and wherein the HoA VPN context provides separation of overlapping home addresses associated with the converged services; and
    upon determining that the tunneled packet is destined for a mobile node, de-tunneling the packet, and
    forwarding the packet to the mobile node.

2. The computer implemented method of claim 1, wherein a source of the tunneled packet belongs to a service provider that is providing wired and wireless service, wherein the service provider belongs to a plurality of remote network elements, wherein the converged services domain is associated with at least some of the plurality of remote network elements, and wherein the converged services domain includes forwarding information for the associated remote network elements.

3. The computer implemented method of claim 2, wherein the plurality of remote network elements includes one or more home agents, wherein each of the one or more home agents are associated with the converged services domain.

4. The computer implemented method of claim 3, wherein at least some of the one or more home agents allocate overlapping home addresses, and wherein for each of the home agents allocating overlapping home addresses, provisioning the HoA VPN context to include one or more separate forwarding structures.

5. The computer implemented method of claim 1, wherein the converged services domain is one of a plurality of converged services domains, wherein the converged services domain and at least one other converged services domain belong to a single wholesale service provider, and wherein the tunneled packet is received from one of a first plurality of home agents belonging to a first single service provider associated with the converged services domain or a second plurality of home agents belonging to a second single service provider associated with the other converged services domain, and wherein the HoA VPN context included in the converged services domain is also used in the other converged services domain.

6. A non-transitory machine-readable medium that provides instructions that, when executed by a processor, causes said processor to perform operations for processing a tunneled packet received at a network element, comprising:
    receiving the tunneled packet at a converged services domain, wherein the converged services domain is capable of processing wired and wireless service, wherein the converged services domain includes a foreign agent context, a care-of address (CoA) context, and a home address (HoA) virtual private network (VPN) context,
    wherein the foreign agent context includes a binding of a circuit to a mobile node,
    wherein the CoA context includes a set of one or more care-of-addresses that are used as tunnel endpoints,
    wherein the received tunneled packet is received at one of the set of care-of addresses, and
    wherein the HoA VPN context provides separation of overlapping home addresses associated with the converged services; and
    upon determining that the tunneled packet is destined for a mobile node, de-tunneling the packet, and
    forwarding the packet to the mobile node.

7. The non-transitory machine-readable medium of claim 6, wherein a source of the tunneled packet belongs to a service provider that is providing wired and wireless service, wherein the service provider belongs to a plurality of remote network elements, wherein the converged services domain is associated with at least some of the plurality of remote network elements, and wherein the converged services domain includes forwarding information for the associated remote network elements.

8. The non-transitory machine-readable medium of claim 7, wherein the plurality of remote network elements includes one or more home agents, wherein each of the one or more home agents is associated with the converged services domain.

9. The non-transitory machine-readable medium of claim 8, wherein at least some of the one or more home agents allocate overlapping home addresses, and wherein for each of the home agents allocating overlapping home addresses, provisioning the HoA VPN context to include one or more separate forwarding structures.

10. The non-transitory machine-readable medium of claim 6, wherein the converged services domain is one of a plurality of converged services domains, wherein the converged services domain and at least one other converged services domain belong to a single wholesale service provider, and wherein the tunneled packet is received from one of a first plurality of home agents belonging to a first single service provider associated with the converged services domain or a second plurality of home agents belonging to a second single service provider associated with the other converged services domain, and wherein the HoA VPN context included in the converged services domain is also used in the other converged services domain.

* * * * *

UNITED STATES PATENT AND TRADEMARK OFFICE
CERTIFICATE OF CORRECTION

PATENT NO. : 8,811,360 B2  Page 1 of 1
APPLICATION NO. : 13/218307
DATED : August 19, 2014
INVENTOR(S) : Balay et al.

It is certified that error appears in the above-identified patent and that said Letters Patent is hereby corrected as shown below:

IN THE SPECIFICATION

In Column 5, Line 35, delete "140A" and insert -- HoA --, therefor.

Signed and Sealed this
Twentieth Day of October, 2015

Michelle K. Lee
*Director of the United States Patent and Trademark Office*